(12) United States Patent
Deng et al.

(10) Patent No.: US 10,277,315 B2
(45) Date of Patent: Apr. 30, 2019

(54) METHOD AND APPARATUS FOR MONITORING WAVELENGTH CHANNEL

(71) Applicant: HUAWEI TECHNOLOGIES CO., LTD., Shenzhen (CN)

(72) Inventors: Ning Deng, Shenzhen (CN); Juan Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 214 days.

(21) Appl. No.: 15/262,632

(22) Filed: Sep. 12, 2016

(65) Prior Publication Data

US 2016/0380696 A1   Dec. 29, 2016

Related U.S. Application Data

(63) Continuation of application No. PCT/CN2014/073380, filed on Mar. 13, 2014.

(51) Int. Cl.
*H04B 10/079* (2013.01)
*H04J 14/02* (2006.01)
*H04B 10/548* (2013.01)

(52) U.S. Cl.
CPC . *H04B 10/07957* (2013.01); *H04B 10/07953* (2013.01); *H04B 10/07955* (2013.01); *H04J 14/02* (2013.01); *H04B 10/548* (2013.01)

(58) Field of Classification Search
CPC .................. H04B 10/07955; H04B 10/07957
See application file for complete search history.

(56) References Cited

U.S. PATENT DOCUMENTS

| | | | |
|---|---|---|---|
| 6,898,214 B1 | 5/2005 | Sinsky et al. | |
| 2003/0067647 A1* | 4/2003 | Wan | H04B 10/505 398/79 |

(Continued)

FOREIGN PATENT DOCUMENTS

| | | | | |
|---|---|---|---|---|
| CA | 2453813 | * | 8/2004 | ............. H04B 10/18 |
| CN | 102742185 | | 10/2012 | |
| CN | 102946275 | | 2/2013 | |

OTHER PUBLICATIONS

International Search Report dated Dec. 12, 2014 in International Application No. PCT/CN2014/073380.

(Continued)

*Primary Examiner* — Nathan M Cors
(74) *Attorney, Agent, or Firm* — Staas & Halsey LLP

(57) ABSTRACT

A method and an apparatus for monitoring a wavelength channel are disclosed. The method includes: performing optical-to-electrical detection on an optical signal on a wavelength channel, to obtain an electrical signal; obtaining a frequency spectrum of the electrical signal; determining a first parameter M according to an equation $M=N_{AC}$, where $N_{AC}$ represents an alternating current component of the frequency spectrum of the electrical signal; and if M is greater than a preset first threshold, determining that the wavelength channel includes a real service signal. According to the method and apparatus, an erroneous configuration or operation of a network management system can be avoided.

17 Claims, 3 Drawing Sheets

(56) References Cited

U.S. PATENT DOCUMENTS

| | | | | |
|---|---|---|---|---|
| 2004/0062549 A1* | 4/2004 | Obeda | ................... | H04B 10/00 |
| | | | | 398/30 |
| 2007/0036541 A1 | 2/2007 | Tanaka | | |
| 2010/0284689 A1 | 11/2010 | Yuki et al. | | |
| 2012/0057151 A1 | 3/2012 | Nakata | | |
| 2012/0106951 A1 | 5/2012 | Wan et al. | | |
| 2012/0141122 A1* | 6/2012 | Carusone | ........... | H04B 10/6971 |
| | | | | 398/37 |
| 2015/0010299 A1 | 1/2015 | Wei et al. | | |
| 2016/0056912 A1* | 2/2016 | Froc | ................... | H04B 10/0779 |
| | | | | 398/27 |

OTHER PUBLICATIONS

Chinese Search Report corresponding to Chinese Patent Application No. 2014800001572.
Chinese Office Action dated Oct. 11, 2017 in corresponding to Chinese Patent Application No. 201480000157.2.
International Search Report dated Dec. 12, 2014 in corresponding International Application No. PCT/CN2014/073380.

* cited by examiner

METHOD AND APPARATUS FOR MONITORING WAVELENGTH CHANNEL

CROSS-REFERENCE TO RELATED APPLICATIONS

This application is a continuation of International Application No. PCT/CN2014/073380, filed on Mar. 13, 2014, which is hereby incorporated by reference in its entirety.

TECHNICAL FIELD

The present invention relates to the field of optical communications, and in particular, to a method and an apparatus for monitoring a wavelength channel.

BACKGROUND

Optical performance monitoring is an important function in an optical communications network. By monitoring and measuring performance of optical components and/or optical signals at some positional points in the optical communications network in real time, an actual status of the optical network is obtained, and network management and maintenance is performed on such a basis. Common performance monitoring of an optical signal includes measurement for a wavelength, a power, an optical signal-to-noise ratio (OSNR) and the like of the optical signal.

In an optical power monitoring solution in the prior art, a power of each wavelength channel in a wavelength division multiplexing (WDM) system is measured, and is reported to a network management system (NMS). However, sometimes some wavelength channels do not have a real service signal, but have relatively high amplified spontaneous emission (ASE) noise and have optical powers close to that of an optical channel with a real service. In the prior art, a power of a channel without a real service signal is still measured, and is reported as a power of an optical signal. However, the optical signal actually does not exist in the system. Therefore, the network management system erroneously considers that the wavelength channel includes a service signal whose optical power is the optical power obtained by means of measurement, which results in incorrect operation and management.

SUMMARY

Embodiments of the present invention provide a method and an apparatus for monitoring a wavelength channel, so that an erroneous configuration or operation of a network management system can be avoided.

According to a first aspect, a method for monitoring a wavelength channel is provided, including:
performing optical-to-electrical detection on an optical signal on a wavelength channel, to obtain an electrical signal;
obtaining a frequency spectrum of the electrical signal;
determining a first parameter M according to an equation $M=N_{AC}$, where $N_{AC}$ represents an alternating current component of the frequency spectrum of the electrical signal; and
if M is greater than a preset first threshold, determining that the wavelength channel includes a real service signal.

With reference to the first aspect, in a first possible implementation manner, the method further includes:
if M is less than a preset second threshold, determining that the wavelength channel includes a real service signal, where the second threshold is less than the first threshold.

With reference to the first aspect or the first possible implementation manner of the first aspect, in a second possible implementation manner, the method further includes:
if M is less than the first threshold and greater than the preset second threshold, determining that the wavelength channel does not include a real service signal, where the second threshold is less than the first threshold.

With reference to the first aspect, in a third possible implementation manner, the method further includes:
if M is less than the first threshold, determining a second parameter N according to an equation $N=(2N_{AC})/(-2(N_{AC}-I_{DC}^2)+\sqrt{4R^4(N_{AC}-I_{DC}^2)^2-4R^2N_{AC}(R^2N_{AC}-I_{DC}^2)})$, where R represents responsivity of a photodetector performing the optical-to-electrical detection; and
if a real part of N is less than a preset third threshold, determining that the wavelength channel includes a real service signal; or if a real part of N is greater than the third threshold, determining that the wavelength channel does not include a real service signal.

With reference to the first aspect or any possible implementation manner of the first to third possible implementation manners of the first aspect, in a fourth possible implementation manner, the first threshold is a value that is obtained in advance and that is between a minimum value of M of at least one real channel that includes an amplitude modulation service signal and a maximum value of M of at least one fake channel that does not include a real service signal; and/or
the second threshold is a value that is obtained in advance and that is between a minimum value of M of at least one fake channel that does not include a real service signal and a maximum value of M of at least one real channel that includes a phase modulation service signal; and/or
the third threshold is a value that is obtained in advance and that is between a minimum value of a real part of N of at least one fake channel that does not include a real service signal and a maximum value of a real part of N of at least one real channel that includes a phase modulation service signal.

With reference to the first aspect or any possible implementation manner of the first to fourth possible implementation manners of the first aspect, in a fifth possible implementation manner, the method further includes:
if it is determined that the wavelength channel includes a real service signal, obtaining an optical power of the wavelength channel; and
if it is determined that the wavelength channel does not include a real service signal, reporting that the wavelength channel does not include a real service signal.

According to a second aspect, a method for monitoring a wavelength channel is provided, including:
performing optical-to-electrical detection on an optical signal on a wavelength channel, to obtain an electrical signal;
obtaining a frequency spectrum of the electrical signal;
determining a third parameter L according to an equation $L=N_{AC}/I_{DC}^2$, where $N_{AC}$ represents an alternating current component of the frequency spectrum of the electrical signal, and $I_{DC}$ represents a direct current component of the frequency spectrum of the electrical signal; and if L is greater than a preset fourth threshold, determining that the wavelength channel includes a real service signal.

With reference to the second aspect, in a first possible implementation manner, the method further includes:

if L is less than a preset fifth threshold, determining that the wavelength channel includes a real service signal, where the fifth threshold is less than the fourth threshold.

With reference to the second aspect or the first possible implementation manner of the second aspect, in a second possible implementation manner, the method further includes:

if L is less than the fourth threshold and greater than the preset fifth threshold, determining that the wavelength channel does not include a real service signal, where the fifth threshold is less than the fourth threshold.

With reference to the second aspect, in a third possible implementation manner, the method further includes:

if L is less than the fourth threshold, determining a second parameter N according to an equation $N=(2N_{AC})/(-2(N_{AC}-I_{DC}^2)+\sqrt{4R^4(N_{AC}-I_{DC}^2)^2-4R^2N_{AC}(R^2N_{AC}-I_{DC}^2)})$, where R represents responsivity of a photodetector performing the optical-to-electrical detection; and if a real part of N is less than a preset third threshold, determining that the wavelength channel includes a real service signal; or if a real part of N is greater than the third threshold, determining that the wavelength channel does not include a real service signal.

With reference to the second aspect or any possible implementation manner of the first to third possible implementation manners of the second aspect, in a fourth possible implementation manner, the fourth threshold is a value that is obtained in advance and that is between a minimum value of L of at least one real channel that includes an amplitude modulation service signal and a maximum value of L of at least one fake channel that does not include a real service signal; and/or the fifth threshold is a value that is obtained in advance and that is between a minimum value of L of at least one fake channel that does not include a real service signal and a maximum value of L of at least one real channel that includes a phase modulation service signal; and/or the third threshold is a value that is obtained in advance and that is between a minimum value of a real part of N of at least one fake channel that does not include a real service signal and a maximum value of a real part of N of at least one real channel that includes a phase modulation service signal.

With reference to the second aspect or any possible implementation manner of the first to fourth possible implementation manners of the second aspect, in a fifth possible implementation manner, the method further includes:

if it is determined that the wavelength channel includes a real service signal, obtaining an optical power of the wavelength channel; and if it is determined that the wavelength channel does not include a real service signal, reporting that the wavelength channel does not include a real service signal.

According to a third aspect, an apparatus for monitoring a wavelength channel is provided, including:

a detection module, configured to perform optical-to-electrical detection on an optical signal on a wavelength channel, to obtain an electrical signal;

a frequency spectrum obtaining module, configured to obtain a frequency spectrum of the electrical signal; and a determining module, configured to: determine a first parameter M according to an equation $M=N_{AC}$, where $N_{AC}$ represents an alternating current component of the frequency spectrum of the electrical signal, and if M is greater than a preset first threshold, determine that the wavelength channel includes a real service signal; or determine a third parameter L according to an equation $L=N_{AC}/I_{DC}^2$, where $N_{AC}$ represents an alternating current component of the frequency spectrum of the electrical signal, and $I_{DC}$ represents a direct current component of the frequency spectrum of the electrical signal, and if L is greater than a preset fourth threshold, determine that the wavelength channel includes a real service signal.

With reference to the third aspect, in a first possible implementation manner, the determining module is further configured to:

if M is less than a preset second threshold, determine that the wavelength channel includes a real service signal, where the second threshold is less than the first threshold; or if L is less than a preset fifth threshold, determine that the wavelength channel includes a real service signal, where the fifth threshold is less than the fourth threshold.

With reference to the third aspect or the first possible implementation manner of the third aspect, in a second possible implementation manner, the determining module is further configured to:

if M is less than the first threshold and greater than the preset second threshold, determine that the wavelength channel does not include a real service signal, where the second threshold is less than the first threshold; or if L is less than the fourth threshold and greater than the preset fifth threshold, determine that the wavelength channel does not include a real service signal, where the fifth threshold is less than the fourth threshold.

With reference to the third aspect, in a third possible implementation manner, the determining module is further configured to:

if M is less than the first threshold or if L is less than the fourth threshold, determine a second parameter N according to an equation $N=(2N_{AC})/(-2(N_{AC}-I_{DC}^2)+\sqrt{4R^4(N_{AC}-I_{DC}^2)^2-4R^2N_{AC}(R^2N_{AC}-I_{DC}^2)})$, where R represents responsivity of a photodetector performing the optical-to-electrical detection; and if a real part of N is less than a preset third threshold, determine that the wavelength channel includes a real service signal; or if a real part of N is greater than the third threshold, determine that the wavelength channel does not include a real service signal.

With reference to the third aspect or any possible implementation manner of the first to third possible implementation manners of the third aspect, in a fourth possible implementation manner, the first threshold is a value that is obtained in advance and that is between a minimum value of M of at least one real channel that includes an amplitude modulation service signal and a maximum value of M of at least one fake channel that does not include a real service signal, or the fourth threshold is a value that is obtained in advance and that is between a minimum value of L of at least one real channel that includes an amplitude modulation service signal and a maximum value of L of at least one fake channel that does not include a real service signal; and/or the second threshold is a value that is obtained in advance and that is between a minimum value of M of at least one fake channel that does not include a real service signal and a maximum value of M of at least one real channel that includes a phase modulation service signal, or the fifth threshold is a value that is obtained in advance and that is between a minimum value of L of at least one fake channel that does not include a real service signal and a maximum value of L of at least one real channel that includes a phase modulation service signal; and/or the third threshold is a value that is obtained in advance and that is between a minimum value of a real part of N of at least one fake channel that does not include a real service signal and a maximum value of a real part of N of at least one real channel that includes a phase modulation service signal.

With reference to the third aspect or any possible implementation manner of the first to fourth possible implementation manners of the third aspect, in a fifth possible implementation manner, the apparatus further includes:

an optical power obtaining module, configured to: when the determining module determines that the wavelength channel includes a real service signal, obtain an optical power of the wavelength channel; and a reporting module, configured to: when the determining module determines that the wavelength channel does not include a real service signal, report that the wavelength channel does not include a real service signal.

Based on the foregoing technical solution, in the method and apparatus for monitoring a wavelength channel that are in the embodiments of the present invention, it is determined according to a relationship between an alternating current component of a frequency spectrum of an electrical signal and a preset threshold or according to a relationship between an alternating current component and a direct current component that are of a frequency spectrum of an electrical signal and preset thresholds whether a wavelength channel includes a real service signal, so that an erroneous configuration or operation of a network management system can be avoided.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the embodiments of the present invention, unless specified otherwise, an optical signal generally represents a total optical signal on a wavelength channel. Correspondingly, in different cases, the optical signal may include a real service signal and optical noise (for example, ASE), or include only a real service signal, or include only optical noise. The real service signal may also be referred to as a service signal, and the optical noise may also be referred to as noise or a fake signal.

In the embodiments of the present invention, a wavelength channel that includes only optical noise but does not include a real service signal is referred to as a fake channel, and a wavelength channel that includes a real service signal is referred to as a real channel.

Figure 1:
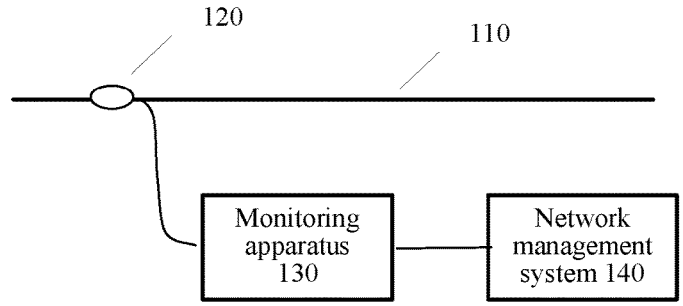
FIG. 1 is a diagram of an application scenario according to an embodiment of the present invention.

FIG. 1 is a diagram of an application scenario according to an embodiment of the present invention. As shown in FIG. 1, a part of an optical signal is coupled from a monitoring point 120 of an optical link 110 and enters a monitoring apparatus 130. After performing monitoring, the monitoring apparatus 130 reports a monitoring result to a network management system 140.

For an optical signal (which may be an optical signal that includes optical noise and a real service signal, or may be optical noise that does not include a real service signal) on a wavelength channel, in an x polarization state, the optical signal may be expressed as:

$$s_x(t) = A_x(t) + n_x(t) \quad (1); \text{ and}$$

in a y polarization state, the optical signal may be expressed as:

$$s_y(t) = A_y(t) + n_y(t) \quad (2)$$

where $A_x(t)$ and $A_y(t)$ represent a field strength of a service signal, and $n_x(t)$ and $n_y(t)$ represent a field strength of optical noise.

A direct current component of a frequency spectrum of an electrical signal corresponding to the received optical signal is:

$$I_{DC} = R \cdot \{E[|A_x(t)|^2 + |A_y(t)|^2 + |n_x(t)|^2 + |n_y(t)|^2]\} = R \cdot \{P_s + 2N_0 B \cdot a\} \quad (3)$$

where R is responsivity of a photodetector, $E[.]$ represents calculating an expectation (an average value), $P_s$ is an optical power of a service signal, $N_0$ is a power density of optical noise, B is a bandwidth of a processing circuit, and a is an equivalent coefficient of an amplitude-frequency response of a processing circuit.

An alternating current component of the frequency spectrum of the electrical signal is:

$$N_{AC} = R^2 \cdot \{E[P(t)^2 - P_s]\} + R^2 \cdot P_s \cdot \{2N_0 B \cdot f\} + R^2 \cdot \{2N_0 B \cdot a\}^2 \quad (4)$$

It can be obtained from the formula (4) that $N_{AC}$ consists of three terms, where a first term reflects a frequency spectrum component of a service signal, a second term reflects a beat noise component of a service signal and optical noise, and a third term reflects optical noise and a beat noise component of the optical noise.

For a general amplitude modulation optical signal, amplitude information of the amplitude modulation optical signal is still reserved after optical-to-electrical detection. Therefore, the first term predominates in the formula (4), that is, the first term matters more than the second term and the third term. Here, "general" means that the optical signal may include an extremely small amount of negligible optical noise, or may include a relatively large amount of optical noise, but the optical noise inside the optical signal still falls within an appropriate range, that is, there is not too much optical noise to affect normal reception of the optical signal, which is also a design criterion of an optical communications network.

For a general phase modulation optical signal, an envelope of an amplitude of the phase modulation optical signal is almost flat. Therefore, an electrical signal after optical-to-electrical detection is almost a direct current signal. Therefore, the second term, that is, a beat noise component of a signal and optical noise, predominates in the formula (4).

For a channel monopolized by a fake signal, that is, optical noise, the third term predominates in the formula (4).

According to the foregoing analysis, generally, for the foregoing three different cases, the alternating current component $N_{AC}$ satisfies the following relationship:

$$N_{AC} \text{ of the amplitude modulation service signal} > N_{AC} \text{ of the fake signal} > N_{AC} \text{ of the phase modulation service signal} \qquad (5)$$

Therefore, in this embodiment of the present invention, it may be determined according to the relation (5) by monitoring $N_{AC}$ of an optical signal on a wavelength channel whether the optical signal is a real channel or a fake channel. Optionally, $N_{AC}$ may be an alternating current component within a frequency range, for example, a frequency range ranging from 0.2 MHz to 2 MHz.

Figure 2:
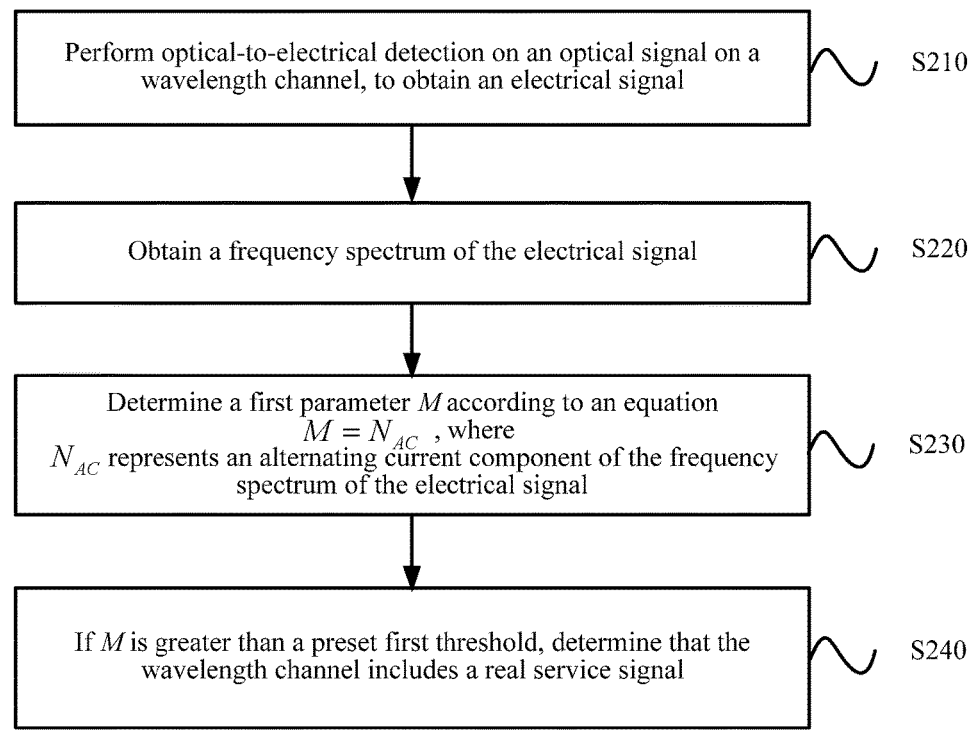
FIG. 2 is a schematic flowchart of a method for monitoring a wavelength channel according to an embodiment of the present invention.

FIG. 2 is a schematic flowchart of a method 200 for monitoring a wavelength channel according to an embodiment of the present invention. The method 200 is performed by an apparatus for monitoring a wavelength channel. For example, the apparatus for monitoring a wavelength channel may be the monitoring apparatus 130 in FIG. 1. As shown in FIG. 2, the method 200 includes:

S210: Perform optical-to-electrical detection on an optical signal on a wavelength channel, to obtain an electrical signal.

S220: Obtain a frequency spectrum of the electrical signal.

S230: Determine a first parameter M according to an equation $M=N_{AC}$, where $N_{AC}$ represents an alternating current component of the frequency spectrum of the electrical signal.

S240: If M is greater than a preset first threshold, determine that the wavelength channel includes a real service signal.

In this embodiment of the present invention, it is determined according to a relationship between the alternating current component $N_{AC}$ of the frequency spectrum of the electrical signal and the preset threshold whether the wavelength channel includes a real service signal.

The apparatus for monitoring a wavelength channel first performs optical-to-electrical detection on the optical signal on the wavelength channel, to obtain the electrical signal. For example, the apparatus for monitoring a wavelength channel adjusts a tunable optical filter (TOF) in the apparatus for monitoring a wavelength channel to be on a center frequency of the monitored wavelength channel, and receives the optical signal by using a receiver, that is, performs optical-to-electrical conversion, to obtain the electrical signal. The receiver may be a low bandwidth optical receiver, and a bandwidth of the receiver may be far lower than a bandwidth of the optical signal, and is, for example, tens of MHz or hundreds of MHz. It should be understood that another method in the prior art may also be used for the step of detecting the optical signal, which is not limited in this embodiment of the present invention.

Then, the apparatus for monitoring a wavelength channel obtains the frequency spectrum of the electrical signal. For example, the electrical signal is first converted into a digital signal, and Fourier transform is performed on the digital signal to transform the digital signal to a frequency domain, thereby obtaining the frequency spectrum of the electrical signal. For example, the Fourier transform may be Fast Fourier transform. The electrical signal may also be converted to the frequency domain in another manner such as by means of an electrical spectrum analyzer, so as to obtain the frequency spectrum of the electrical signal, which is not limited in the present invention.

After obtaining the frequency spectrum of the electrical signal, the apparatus for monitoring a wavelength channel determines, according to a relationship between the alternating current component of the frequency spectrum of the electrical signal and a preset threshold, whether the wavelength channel includes a real service signal.

Optionally, the alternating current component of the frequency spectrum may be a power or energy of the frequency spectrum within a particular frequency range (not including a zero frequency), or may be an amplitude of the frequency spectrum in a particular frequency (not a zero frequency) or a sum of amplitudes of the frequency spectrum in some frequencies (not including a zero frequency). A direct current component of the frequency spectrum is an amplitude of the frequency spectrum in the zero frequency, and the direct current component may also be obtained by averaging the electrical signal (not converted to the frequency domain).

It can be known from the formula (5) that alternating current components of frequency spectrums of electrical signals of an amplitude modulation service signal, a phase modulation service signal, and a fake signal have relatively large differences. On such a basis, it can be determined according to a relationship between an alternating current component of a frequency spectrum of an electrical signal and a preset threshold whether a wavelength channel includes an amplitude modulation service signal, a phase modulation service signal, or a fake signal, where the foregoing two signals, that is, the amplitude modulation service signal and the phase modulation service signal are real service signals. In this way, in this embodiment of the present invention, it can be determined whether the wavelength channel includes a real service signal, and a fake signal will not be used as a real service signal, so that an erroneous configuration or operation of a network management system can be avoided.

Specifically, in this embodiment of the present invention, the first parameter M is made equal to the alternating current component of the frequency spectrum of the electrical signal, that is:

$$M=N_{AC} \qquad (6)$$

After the frequency spectrum of the electrical signal is obtained, M is calculated, and then is compared with the preset first threshold. If M is greater than the first threshold, it represents that the wavelength channel includes an amplitude modulation service signal. Therefore, it is determined that the wavelength channel includes a real service signal.

Optionally, if M is less than a preset second threshold, it represents that the wavelength channel includes a phase modulation service signal. Therefore, it is determined that the wavelength channel includes a real service signal, where the second threshold is less than the first threshold.

Optionally, if M is less than the first threshold and greater than the second threshold, it represents that the wavelength channel includes only optical noise. Therefore, it is determined that the wavelength channel does not include a real service signal.

It should be understood that in this embodiment of the present invention, M may also be first compared with the second threshold after M is determined. That is, a sequence of comparing M with the first threshold and comparing M with the second threshold is not limited in this embodiment of the present invention.

In the method for monitoring a wavelength channel in this embodiment of the present invention, it is determined according to a relationship between an alternating current component of a frequency spectrum of an electrical signal and a preset threshold whether a wavelength channel includes a real service signal, so that an erroneous configuration or operation of a network management system can be avoided.

It should be understood that in determining conditions in this embodiment of the present invention, "greater than" or "less than" is used for description, and if "equal to" occurs, it may be taken as either "greater than" and "less than", which shall fall within the protection scope of the present invention.

Optionally, in this embodiment of the present invention, the first threshold is a value that is obtained in advance and that is between a minimum value of M of at least one real channel that includes an amplitude modulation service signal and a maximum value of M of at least one fake channel that does not include a real service signal.

Optionally, in this embodiment of the present invention, the second threshold is a value that is obtained in advance and that is between a minimum value of M of at least one fake channel that does not include a real service signal and a maximum value of M of at least one real channel that includes a phase modulation service signal.

That is, the first threshold and/or the second threshold may be determined according to multiple preconfigured wavelength channels. Specifically, multiple wavelength channels are preconfigured, that is, a known optical signal is configured in each wavelength channel. The multiple preconfigured wavelength channels include multiple real channels and at least one fake channel. The multiple real channels include at least one real channel that includes an amplitude modulation service signal and at least one real channel that includes a phase modulation service signal. Optionally, the multiple real channels include service signals of various code types and at various bit rates, where some are amplitude modulation service signals, and others are phase modulation service signals. OSNRs of the real channels are lowest OSNRs that can be received by the receiver. Optionally, the OSNRs may be lowest OSNRs that can be received by the receiver in a back-to-back case.

M of each wavelength channel of the multiple preconfigured wavelength channels is separately determined.

For example, a center frequency of the TOF is separately adjusted into a center frequency of each wavelength channel, optical-to-electrical conversion is performed on the optical signal to convert the optical signal into a digital signal, and then Fourier transform is performed on the digital signal to convert the digital signal to a frequency domain, so as to obtain a frequency spectrum of an electrical signal. Then M of each channel is calculated according to the formula (6).

A maximum value of M of each fake channel and a minimum value of M of each amplitude modulation real channel are selected, and a value between the maximum value and the minimum value, for example, an average value of the maximum value and the minimum value, is obtained as the first threshold. A minimum value of M of each fake channel and a maximum value of M of each amplitude modulation real channel are selected, and a value between the maximum value and the minimum value, for example, an average value of the maximum value and the minimum value, is obtained as the second threshold.

For a general amplitude modulation optical signal, amplitude information of the amplitude modulation optical signal is still reserved after optical-to-electrical detection. Therefore, the first term predominates in the formula (4). Generally, this term has a relatively large value; therefore, $N_{AC}$ is also large, and the amplitude modulation optical signal is easily distinguished from a phase modulation optical signal or a fake signal. That is, if M is greater than the first threshold, it may be determined that the wavelength channel includes an amplitude modulation service signal, that is, determined that the wavelength channel includes a real service signal.

For a phase modulation optical signal or a fake signal, especially when the phase modulation optical signal includes relatively much optical noise, (that is, having a relatively low OSNR), the phase modulation optical signal and the fake signal may have relatively close $N_{AC}$. In this case, the phase modulation optical signal and the fake signal are distinguished in this embodiment of the present invention in another manner.

In Formulas (3) and (4), $P_n=2N_0B\cdot a$, and a second parameter N is defined to represent a value of optical noise relative to a service signal, that is:

$$N=P_n/P_s \qquad (7)$$

Considering that regardless of an all-optical noise fake channel or a phase modulation optical signal, the first term of the formula (4) is 0 or relatively small, and is negligible, Formulas (3) and (4) may be rewritten as:

$$I_{DC}=RP_n\cdot(N+1) \qquad (8)$$

$$N_{AC}=R^2P_n^2(2N+1) \qquad (9)$$

It may be obtained from the foregoing two formulas that $$N=(2N_{AC})/(-2(N_{AC}-I_{DC}^2)+ \\ \sqrt{4R^4(N_{AC}-I_{DC}^2)^2-4R^2N_{AC}(R^2N_{AC}-I_{DC}^2)}) \qquad (10)$$

A real part of N is compared with a preset third threshold. If the real part of N is less than the third threshold, it means that $N=P_n/P_s$ is relatively small, that is, the wavelength channel has relatively a little optical noise. Therefore, it may be determined that there is a real service optical signal (a phase modulation optical signal) on the wavelength channel.

If the real part of N is greater than the third threshold, it means that $P_n$ is relatively large or the assumption of the formula (10) is not true (that is, the first term in the formula (4) is very large). The amplitude modulation optical signal may be determined in combination with a comparison between M and the first threshold; therefore, the three cases, that is, the amplitude modulation optical signal, the phase modulation optical signal, and the fake channel may be distinguished according to a relationship between M and the preset threshold and according to a relationship between the real part of N and the preset threshold. First, it may be determined according to a value relationship between M and the first threshold whether an amplitude modulation service signal is included, and then it is determined according to a value relationship between the real part of N and the third threshold whether a phase modulation service signal or optical noise is included. Alternatively, first, it may be determined according to a value relationship between the real part of N and the third threshold whether a phase modulation service signal is included, and then it is determined according to a value relationship between M and the first threshold whether an amplitude modulation service signal or optical noise is included.

Optionally, in an embodiment of the present invention, the method 200 further includes:

if M is less than the first threshold, determining a second parameter N according to an equation $N=(2N_{AC})/(-2(N_{AC}-I_{DC}^2)+\sqrt{4R^4(N_{AC}-I_{DC}^2)^2-4R^2N_{AC}(R^2N_{AC}-I_{DC}^2)})$, where R represents responsivity of a photodetector performing the optical-to-electrical detection; and if a real part of N is less than a preset third threshold, determining that the wavelength channel includes a real service signal; or if a real part of N is greater than the third threshold, determining that the wavelength channel does not include a real service signal.

In this embodiment, first, M is determined according to the formula (6), and M is compared with the preset first threshold.

If M is greater than the first threshold, it represents that the wavelength channel includes an amplitude modulation service signal. Therefore, it is determined that the wavelength channel includes a real service signal.

If M is less than the first threshold, N is then determined according to the formula (10), and the real part of N is compared with the preset third threshold.

If the real part of N is less than the third threshold, it represents that the wavelength channel includes a phase modulation service signal. Therefore, it is determined that the wavelength channel includes a real service signal.

If the real part of N is greater than the third threshold, it is determined that the wavelength channel does not include a real service signal.

Optionally, first, N is determined according to the formula (10), and the real part of N is compared with the preset third threshold.

If the real part of N is less than the third threshold, it represents that the wavelength channel includes a phase modulation service signal. Therefore, it is determined that the wavelength channel includes a real service signal.

If the real part of N is greater than the third threshold, M is then determined according to the formula (6), and M is compared with the preset first threshold.

If M is greater than the first threshold, it represents that the wavelength channel includes an amplitude modulation service signal. Therefore, it is determined that the wavelength channel includes a real service signal.

If M is less than the first threshold, it is determined that the wavelength channel does not include a real service signal.

Optionally, in this embodiment of the present invention, the third threshold is a value that is obtained in advance and that is between a minimum value of a real part of N of at least one fake channel that does not include a real service signal and a maximum value of a real part of N of at least one real channel that includes a phase modulation service signal.

Similar to the first threshold and the second threshold, the third threshold may also be determined according to multiple preconfigured wavelength channels. For example, a minimum value of the real part of N of each preconfigured fake channel and a maximum value of the real part of N of each preconfigured amplitude modulation real channel are selected, and a value between the minimum value and the maximum value, for example, an average value of the minimum value and the maximum value, is obtained as the third threshold.

After determining whether the wavelength channel includes a real service signal, according to a corresponding result, the apparatus for monitoring a wavelength channel then obtains an optical power of the wavelength channel or reports the corresponding result to a network management system.

In this embodiment of the present invention, optionally, the method 200 further includes:

if it is determined that the wavelength channel includes a real service signal, obtaining an optical power of the wavelength channel; and if it is determined that the wavelength channel does not include a real service signal, reporting that the wavelength channel does not include a real service signal.

Specifically, if it is determined that the wavelength channel includes a real service signal, that is, the wavelength channel is a real channel, the optical power of the wavelength channel is obtained. Various methods in the prior art may be used to obtain the optical power of the wavelength channel, and are not limited in the present invention. If it is determined that the wavelength channel does not include a real service signal, that is, the wavelength channel is a fake channel, the optical power of the wavelength channel is not obtained, and it may be further reported to the network management system that the wavelength channel does not include a real service signal, so that the network management system performs subsequent operation and management on such a basis.

Therefore, in the method for monitoring a wavelength channel in this embodiment of the present invention, it is determined according to a relationship between an alternating current component of a frequency spectrum of an electrical signal and a preset threshold whether a wavelength channel includes a real service signal, and when the wavelength channel does not include a real service signal, it is reported to a network management system that the wavelength channel does not include a real service signal, so that an erroneous configuration or operation of the network management system can be avoided.

A power of an optical signal on a wavelength channel and a power of an optical signal in another wavelength channel may have a relatively large difference. In this case, for optical signals or fake signals of a same type in different wavelength channels, $N_{AC}$ of the optical signals or the fake signals of the same type may also greatly differ from each other. To eliminate this impact, $N_{AC}$ may be normalized according to the power of the optical signal on the wavelength channel.

Figure 3:
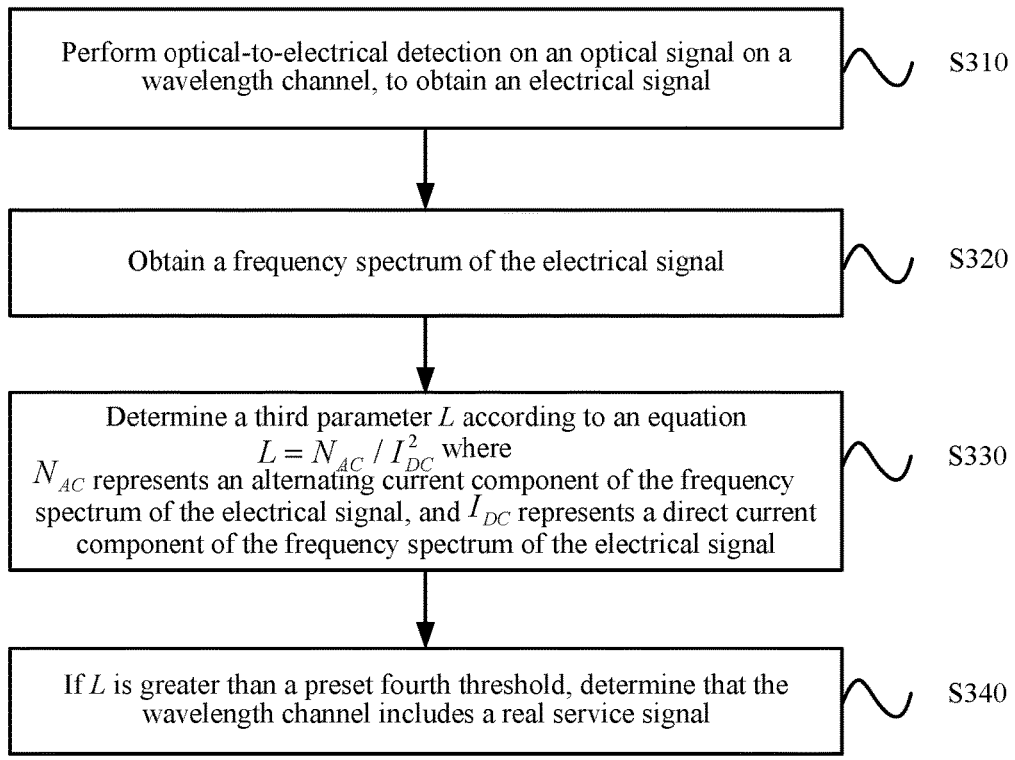
FIG. 3 is a schematic flowchart of a method for monitoring a wavelength channel according to another embodiment of the present invention.

FIG. 3 is a schematic flowchart of a method 300 for monitoring a wavelength channel according to an embodiment of the present invention. The method 300 is performed by an apparatus for monitoring a wavelength channel. For example, the apparatus for monitoring a wavelength channel may be the monitoring apparatus 130 in FIG. 1. As shown in FIG. 3, the method 300 includes:

S310: Perform optical-to-electrical detection on an optical signal on a wavelength channel, to obtain an electrical signal.

S320: Obtain a frequency spectrum of the electrical signal.

S330: Determine a third parameter L according to an equation $L=N_{AC}/I_{DC}^2$, where $N_{AC}$ represents an alternating current component of the frequency spectrum of the electrical signal, and $I_{DC}$ represents a direct current component of the frequency spectrum of the electrical signal.

S340: If L is greater than a preset fourth threshold, determine that the wavelength channel includes a real service signal.

In this embodiment of the present invention, it is determined according to a relationship between the alternating current component and the direct current component that are of the frequency spectrum of the electrical signal and preset thresholds whether the wavelength channel includes a real service signal.

The apparatus for monitoring a wavelength channel first performs optical-to-electrical detection on the optical signal on the wavelength channel, to obtain the electrical signal. For example, the apparatus for monitoring a wavelength channel adjusts a tunable optical filter in the apparatus for monitoring a wavelength channel to be on a center frequency of the monitored wavelength channel, and receives the optical signal by using a receiver, that is, performs optical-to-electrical conversion, to obtain the electrical signal. The receiver may be a low bandwidth optical receiver, and a bandwidth of the receiver may be far lower than a bandwidth of the optical signal, and is, for example, tens of MHz or hundreds of MHz. It should be understood that another method in the prior art may also be used for the step of detecting the optical signal, which is not limited in this embodiment of the present invention.

Then, the apparatus for monitoring a wavelength channel obtains the frequency spectrum of the electrical signal. For example, the electrical signal is first converted into a digital signal, and Fourier transform is performed on the digital signal to transform the digital signal to a frequency domain, thereby obtaining the frequency spectrum of the electrical signal. For example, the Fourier transform may be Fast Fourier transform. The electrical signal may also be converted to the frequency domain in another manner such as by means of an electrical spectrum analyzer, so as to obtain the frequency spectrum of the electrical signal, which is not limited in the present invention.

After obtaining the frequency spectrum of the electrical signal, the apparatus for monitoring a wavelength channel normalizes an alternating current component of the frequency spectrum of the electrical signal according to a power of the optical signal on the wavelength channel. The power of the optical signal on the wavelength channel is reflected by $I_{DC}$; therefore, $N_{AC}$ may be normalized according to $I_{DC}$.

Specifically, in this embodiment of the present invention, the third parameter L is determined by using the following formula:

$$L=N_{AC}/I_{DC}^2 \qquad (11)$$

After the frequency spectrum of the electrical signal is obtained, L is calculated according to the formula (11), and then L is compared with the preset fourth threshold. If L is greater than the fourth threshold, it represents that the wavelength channel includes an amplitude modulation service signal. Therefore, it is determined that the wavelength channel includes a real service signal.

Optionally, if L is less than a preset fifth threshold, it represents that the wavelength channel includes a phase modulation service signal. Therefore, it is determined that the wavelength channel includes a real service signal, where the sixth threshold is less than the fifth threshold.

Optionally, if L is less than the fourth threshold and greater than the fifth threshold, it represents that the wavelength channel includes only optical noise. Therefore, it is determined that the wavelength channel does not include a real service signal.

It should be understood that in this embodiment of the present invention, L may also be first compared with the fifth threshold after L is determined. That is, a sequence of comparing L with the fourth threshold and comparing L with the fifth threshold is not limited in this embodiment of the present invention.

In the method for monitoring a wavelength channel in this embodiment of the present invention, it is determined according to a relationship between an alternating current component and a direct current component that are of a frequency spectrum of an electrical signal and preset thresholds whether a wavelength channel includes a real service signal, so that an erroneous configuration or operation of a network management system can be avoided.

Optionally, in this embodiment of the present invention, the fourth threshold is a value that is obtained in advance and that is between a minimum value of L of at least one real channel that includes an amplitude modulation service signal and a maximum value of L of at least one fake channel that does not include a real service signal.

Optionally, in this embodiment of the present invention, the fifth threshold is a value that is obtained in advance and that is between a minimum value of L of at least one fake channel that does not include a real service signal and a maximum value of L of at least one real channel that includes a phase modulation service signal.

That is, the fourth threshold and/or the fifth threshold may be determined according to multiple preconfigured wavelength channels. Specifically, multiple wavelength channels are preconfigured, that is, a known optical signal is configured in each wavelength channel. The multiple preconfigured wavelength channels include multiple real channels and at least one fake channel. The multiple real channels include at least one real channel that includes an amplitude modulation service signal and at least one real channel that includes a phase modulation service signal. Optionally, the multiple real channels include service signals of various code types and at various bit rates, where some are amplitude modulation service signals, and others are phase modulation service signals. OSNRs of the real channels are lowest OSNRs that can be received by the receiver. Optionally, the OSNRs may be lowest OSNRs that can be received by the receiver in a back-to-back case.

L of each wavelength channel of the multiple preconfigured wavelength channels is separately determined.

For example, a center frequency of the TOF is separately adjusted into a center frequency of each wavelength channel, optical-to-electrical conversion is performed on the optical signal to convert the optical signal into a digital signal, and then Fourier transform is performed on the digital signal to convert the digital signal to a frequency domain, so as to obtain a frequency spectrum of an electrical signal. Then L of each channel is calculated according to the formula (11).

A maximum value of L of each fake channel and a minimum value of L of each amplitude modulation real channel are selected, and a value between the maximum value and the minimum value, for example, an average value of the maximum value and the minimum value, is obtained as the fourth threshold. A minimum value of L of each fake channel and a maximum value of L of each amplitude modulation real channel are selected, and a value between the maximum value and the minimum value, for example, an average value between the maximum value and the minimum value, is obtained as the fifth threshold.

Optionally, in an embodiment of the present invention, the method 300 further includes:
  if L is less than the fourth threshold, determining a second parameter N according to an equation $N=(2N_{AC})/(-2(N_{AC}-I_{DC}^2)+\sqrt{4R^4(N_{AC}-I_{DC}^2)^2-4R^2N_{AC}(R^2N_{AC}-I_{DC}^2)})$, where R represents responsivity of a photodetector performing the optical-to-electrical detection; and
  if a real part of N is less than a preset third threshold, determining that the wavelength channel includes a real service signal; or if a real part of N is greater than the third threshold, determining that the wavelength channel does not include a real service signal.

In this embodiment, first, L is determined according to the formula (11), and L is compared with the preset fourth threshold.

If L is greater than the fourth threshold, it represents that the wavelength channel includes an amplitude modulation service signal. Therefore, it is determined that the wavelength channel includes a real service signal.

If L is less than the fifth threshold, N is then determined according to the formula (10), and the real part of N is compared with the preset third threshold.

If the real part of N is less than the third threshold, it represents that the wavelength channel includes a phase modulation service signal. Therefore, it is determined that the wavelength channel includes a real service signal.

If the real part of N is greater than the third threshold, it is determined that the wavelength channel does not include a real service signal.

Optionally, first, N is determined according to the formula (10), and the real part of N is compared with the preset third threshold.

If the real part of N is less than the third threshold, it represents that the wavelength channel includes a phase modulation service signal. Therefore, it is determined that the wavelength channel includes a real service signal.

If the real part of N is greater than the third threshold, L is then determined according to the formula (11), and L is compared with the preset fourth threshold.

If L is greater than the fourth threshold, it represents that the wavelength channel includes an amplitude modulation service signal. Therefore, it is determined that the wavelength channel includes a real service signal.

If L is less than the fourth threshold, it is determined that the wavelength channel does not include a real service signal.

Optionally, in this embodiment of the present invention, the third threshold is a value that is obtained in advance and that is between a minimum value of a real part of N of at least one fake channel that does not include a real service signal and a maximum value of a real part of N of at least one real channel that includes a phase modulation service signal.

Similar to the fourth threshold and the fifth threshold, the third threshold may also be determined according to multiple preconfigured wavelength channels. For example, a minimum value of the real part of N of each preconfigured fake channel and a maximum value of the real part of N of each preconfigured amplitude modulation real channel are selected, and a value between the minimum value and the maximum value, for example, an average value of the minimum value and the maximum value, is obtained as the third threshold.

After determining whether the wavelength channel includes a real service signal, according to a corresponding result, the apparatus for monitoring a wavelength channel then obtains an optical power of the wavelength channel or reports the corresponding result to a network management system.

In this embodiment of the present invention, optionally, the method 300 further includes:
  if it is determined that the wavelength channel includes a real service signal, obtaining an optical power of the wavelength channel; and
  if it is determined that the wavelength channel does not include a real service signal, reporting that the wavelength channel does not include a real service signal.

Specifically, if it is determined that the wavelength channel includes a real service signal, that is, the wavelength channel is a real channel, the optical power of the wavelength channel is obtained. Various methods in the prior art may be used to obtain the optical power of the wavelength channel, and are not limited in the present invention. If it is determined that the wavelength channel does not include a real service signal, that is, the wavelength channel is a fake channel, the optical power of the wavelength channel is not obtained, and it may be further reported to the network management system that the wavelength channel does not include a real service signal, so that the network management system performs subsequent operation and management on such a basis.

Therefore, in the method for monitoring a wavelength channel in this embodiment of the present invention, it is determined according to a relationship between an alternating current component and a direct current component that are of a frequency spectrum of an electrical signal and preset thresholds whether a wavelength channel includes a real service signal, and when the wavelength channel does not include a real service signal, it is reported to a network management system that the wavelength channel does not include a real service signal, so that an erroneous configuration or operation of the network management system can be avoided.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

The methods for monitoring a wavelength channel according to the embodiments of the present invention are described in detail above, and apparatuses for monitoring a wavelength channel according to embodiments of the present invention are described below.

Figure 4:
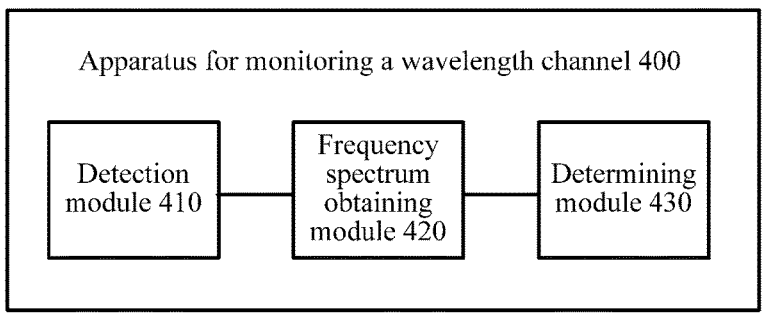
FIG. 4 is a schematic block diagram of an apparatus for monitoring a wavelength channel according to an embodiment of the present invention.

FIG. 4 is a schematic block diagram of an apparatus 400 for monitoring a wavelength channel according to an embodiment of the present invention. As shown in FIG. 4, the apparatus 400 includes:

a detection module 410, configured to perform optical-to-electrical detection on an optical signal on a wavelength channel, to obtain an electrical signal;

a frequency spectrum obtaining module 420, configured to obtain a frequency spectrum of the electrical signal; and a determining module 430, configured to: determine a first parameter M according to an equation $M=N_{AC}$, where $N_{AC}$ represents an alternating current component of the frequency spectrum of the electrical signal, and if M is greater than a preset first threshold, determine that the wavelength channel includes a real service signal; or determine a third parameter L according to an equation $L=N_{AC}/I_{DC}^2$, where $N_{AC}$ represents alternating current component of the frequency spectrum of the electrical signal, and $I_{DC}$ represents a direct current component of the frequency spectrum of the electrical signal, and if L is greater than a preset fourth threshold, determine that the wavelength channel includes a real service signal.

In this embodiment of the present invention, the apparatus 400 for monitoring a wavelength channel performs optical-to-electrical detection on the optical signal on the wavelength channel by using the detection module 410, to obtain the electrical signal. Specifically, the detection module 410 may include a tunable optical filter and a receiver. The tunable optical filter is adjusted to be on a center frequency of the monitored wavelength channel, and the receiver receives the optical signal, that is, performs optical-to-electrical conversion, to obtain the electrical signal. The receiver may be a low bandwidth optical receiver, and a bandwidth of the receiver may be far lower than a bandwidth of the optical signal, and is, for example, tens of MHz or hundreds of MHz.

The frequency spectrum obtaining module 420 obtains the frequency spectrum of the electrical signal. For example, the electrical signal is first converted into a digital signal, and Fourier transform is performed on the digital signal to transform the digital signal to a frequency domain, thereby obtaining the frequency spectrum of the electrical signal. For example, the Fourier transform may be Fast Fourier transform. The electrical signal may also be converted to the frequency domain in another manner such as by means of an electrical spectrum analyzer, so as to obtain the frequency spectrum of the electrical signal, which is not limited in the present invention.

After obtaining the frequency spectrum of the electrical signal, the determining module 430 determines, according to a relationship between the alternating current component of the frequency spectrum of the electrical signal and a preset threshold or according to a relationship between the alternating current component and the direct current component that are of the frequency spectrum of the electrical signal and preset thresholds, whether the wavelength channel includes a real service signal.

Optionally, the alternating current component of the frequency spectrum may be a power or energy of the frequency spectrum within a particular frequency range (not including a zero frequency), or may be an amplitude of the frequency spectrum in a particular frequency (not a zero frequency) or a sum of amplitudes of the frequency spectrum in some frequencies (not including a zero frequency). The direct current component of the frequency spectrum is an amplitude of the frequency spectrum in the zero frequency, and the direct current component may also be obtained by averaging the electrical signal (not converted to the frequency domain).

Specifically, the determining module 430 may determine the first parameter M according to the formula (6) or determine the third parameter L according to (11), and then determine, according to the relationship between M or L and the corresponding preset threshold, whether the wavelength channel includes a real service signal.

When the formula (6) is used, the determining module 430 is configured to: if M is greater than the preset first threshold, determine that the wavelength channel includes a real service signal.

Optionally, the determining module 430 is configured to: if M is less than a preset second threshold, determine that the wavelength channel includes a real service signal, where the second threshold is less than the first threshold.

Optionally, the determining module 430 is configured to: if M is less than the first threshold and greater than the preset second threshold, determine that the wavelength channel does not include a real service signal, where the second threshold is less than the first threshold.

When the formula (11) is used, the determining module 430 is configured to: if L is greater than a preset fourth threshold, determine that the wavelength channel includes a real service signal.

Optionally, the determining module 430 is configured to: if L is less than a preset fifth threshold, determine that the wavelength channel includes a real service signal, where the fifth threshold is less than the fourth threshold.

Optionally, the determining module 430 is configured to: if L is less than the fourth threshold and greater than the preset fifth threshold, determine that the wavelength channel does not include a real service signal, where the fifth threshold is less than the fourth threshold.

In this way, in this embodiment of the present invention, it can be determined whether the wavelength channel includes a real service signal, and a fake signal will not be used as a real service signal, so that an erroneous configuration or operation of a network management system can be avoided.

Therefore, in the apparatus for monitoring a wavelength channel in this embodiment of the present invention, it is determined according to a relationship between an alternating current component of a frequency spectrum of an electrical signal and a preset threshold or according to a relationship between an alternating current component and a direct current component that are of a frequency spectrum of an electrical signal and preset thresholds whether a wavelength channel includes a real service signal, so that an erroneous configuration or operation of a network management system can be avoided.

Optionally, in this embodiment of the present invention, the first threshold is a value that is obtained in advance and that is between a minimum value of M of at least one real channel that includes an amplitude modulation service signal and a maximum value of M of at least one fake channel that does not include a real service signal.

Optionally, in this embodiment of the present invention, the second threshold is a value that is obtained in advance and that is between a minimum value of M of at least one fake channel that does not include a real service signal and a maximum value of M of at least one real channel that includes a phase modulation service signal.

Optionally, in this embodiment of the present invention, the fourth threshold is a value that is obtained in advance and that is between a minimum value of L of at least one real channel that includes an amplitude modulation service signal and a maximum value of L of at least one fake channel that does not include a real service signal.

Optionally, in this embodiment of the present invention, the fifth threshold is a value that is obtained in advance and that is between a minimum value of L of at least one fake channel that does not include a real service signal and a maximum value of L of at least one real channel that includes a phase modulation service signal.

In this embodiment of the present invention, optionally, when the formula (6) is used, the determining module 430 is further configured to:
- if M is less than the first threshold, determine a second parameter N according to an equation $N=(2N_{AC})/(-2(N_{AC}-I_{DC}^2)+\sqrt{4R^4(N_{AC}-I_{DC}^2)^2-4R^2N_{AC}(R^2N_{AC}-I_{DC}^2)})$, where R represents responsivity of a photodetector performing the optical-to-electrical detection; and
- if a real part of N is less than a preset third threshold, determine that the wavelength channel includes a real service signal; or if a real part of N is greater than the third threshold, determine that the wavelength channel does not include a real service signal.

In this embodiment, first, the determining module 430 determines M according to the formula (6), and compares M with the preset first threshold.

If M is greater than the first threshold, it represents that the wavelength channel includes an amplitude modulation service signal. Therefore, it is determined that the wavelength channel includes a real service signal.

If M is less than the first threshold, N is then determined according to the formula (10), and the real part of N is compared with the preset third threshold.

If the real part of N is less than the third threshold, it represents that the wavelength channel includes a phase modulation service signal. Therefore, it is determined that the wavelength channel includes a real service signal.

If the real part of N is greater than the third threshold, it is determined that the wavelength channel does not include a real service signal.

Optionally, when the formula (11) is used, the determining module 430 is further configured to:
- if L is less than the fourth threshold, determine a second parameter N according to an equation $N=(2N_{AC})/(-2(N_{AC}-I_{DC}^2)+\sqrt{4R^4(N_{AC}-I_{DC}^2)^2-4R^2N_{AC}(R^2N_{AC}-I_{DC}^2)})$, where R represents responsivity of a photodetector performing the optical-to-electrical detection; and
- if a real part of N is less than a preset third threshold, determine that the wavelength channel includes a real service signal; or if a real part of N is greater than the third threshold, determine that the wavelength channel does not include a real service signal.

In this embodiment, first, the determining module 430 determines L according to the formula (11), and compares L with the preset fourth threshold.

If L is greater than the fourth threshold, it represents that the wavelength channel includes an amplitude modulation service signal. Therefore, it is determined that the wavelength channel includes a real service signal.

If L is less than the fifth threshold, N is then determined according to the formula (10), and the real part of N is compared with the preset third threshold.

If the real part of N is less than the third threshold, it represents that the wavelength channel includes a phase modulation service signal. Therefore, it is determined that the wavelength channel includes a real service signal.

If the real part of N is greater than the third threshold, it is determined that the wavelength channel does not include a real service signal.

Optionally, in this embodiment of the present invention, the third threshold is a value that is obtained in advance and that is between a minimum value of a real part of N of at least one fake channel that does not include a real service signal and a maximum value of a real part of N of at least one real channel that includes a phase modulation service signal.

Figure 5:
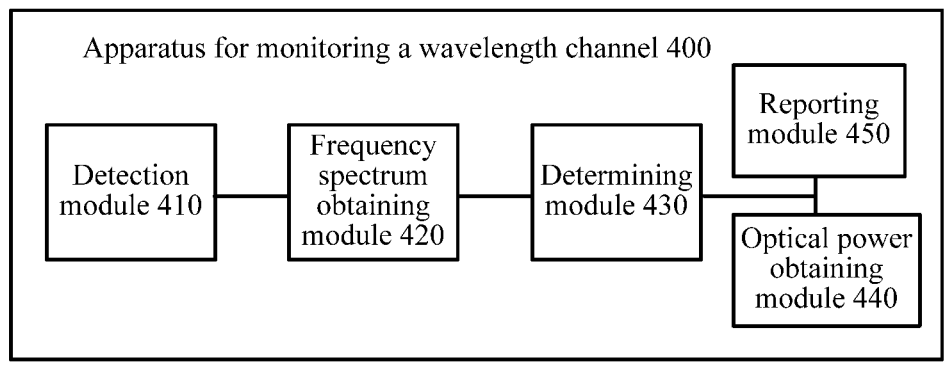
FIG. 5 is a schematic block diagram of an apparatus for monitoring a wavelength channel according to another embodiment of the present invention.

In this embodiment of the present invention, optionally, as shown in FIG. 5, the apparatus 400 further includes:
- an optical power obtaining module 440, configured to: when the determining module 430 determines that the wavelength channel includes a real service signal, obtain an optical power of the wavelength channel; and
- a reporting module 450, configured to: when the determining module 430 determines that the wavelength channel does not include a real service signal, report that the wavelength channel does not include a real service signal.

Specifically, if the determining module 430 determines that the wavelength channel includes a real service signal, that is, the wavelength channel is a real channel, the optical power obtaining module 440 obtains the optical power of the wavelength channel. Various methods in the prior art may be used to obtain the optical power of the wavelength channel, and are not limited in the present invention. If the determining module 430 determines that the wavelength channel does not include a real service signal, that is, the wavelength channel is a fake channel, the optical power of the wavelength channel is not obtained, and the reporting module 450 may further report to the network management system that the wavelength channel does not include a real service signal, so that the network management system performs subsequent operation and management on such a basis.

The apparatus for monitoring a wavelength channel 400 according to this embodiment of the present invention may correspond to an entity (such as the monitoring apparatus 130 shown in FIG. 1) for performing the method 200 for monitoring a wavelength channel or the method 300 for monitoring a wavelength channel according to the embodiment of the present invention, and the foregoing and other operations and/or functions of the modules in the apparatus 400 are separately used to implement corresponding procedures of the methods in the foregoing method embodiments. For brevity, details are not described herein again.

In the apparatus for monitoring a wavelength channel in this embodiment of the present invention, it is determined according to a relationship between an alternating current component of a frequency spectrum of an electrical signal and a preset threshold or according to a relationship between an alternating current component and a direct current component that are of a frequency spectrum of an electrical signal and preset thresholds whether a wavelength channel includes a real service signal, and when the wavelength channel does not include a real service signal, it is reported to a network management system that the wavelength channel does not include a real service signal, so that an erroneous configuration or operation of the network management system can be avoided.

Figure 6:
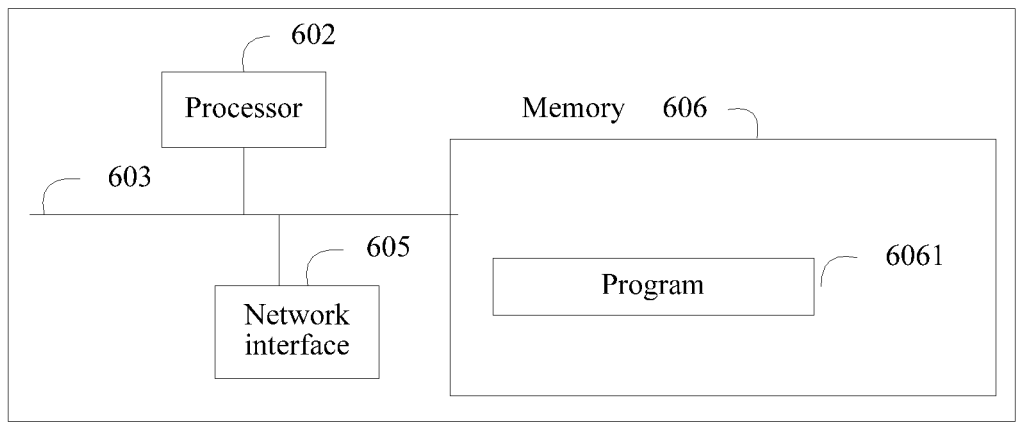
FIG. 6 is a schematic structural diagram of an apparatus for monitoring a wavelength channel according to still another embodiment of the present invention.

FIG. 6 shows a structure of an apparatus for monitoring a wavelength channel according to still another embodiment of the present invention, and the apparatus includes at least one processor 602 (such as a CPU), at least one network interface 605 or another communications interface, a memory 606, and at least one communications bus 603, configured to implement connections and communication between these components. The processor 602 is configured to execute an executable module, for example, a computer program, stored in the memory 606. The memory 606 may include a high-speed random access memory (RAM: Random Access Memory), or may further include a non-volatile memory (non-volatile memory), for example, at least one magnetic disk storage. A communication connection to at least one another network element is implemented by using the at least one network interface 605 (which may be wired or wireless).

In some implementation manners, the memory 606 stores a program 6061, and the processor 602 executes the program 6061, as so to perform the following operations:

performing optical-to-electrical detection on an optical signal on a wavelength channel, to obtain an electrical signal;

obtaining a frequency spectrum of the electrical signal;

determining a first parameter M according to an equation $M=N_{AC}$, where $N_{AC}$ represents an alternating current component of the frequency spectrum of the electrical signal; and if M is greater than a preset first threshold, determining that the wavelength channel includes a real service signal; or determining a third parameter L according to an equation $L=N_{AC}/I_{DC}^2$, where $N_{AC}$ represents an alternating current component of the frequency spectrum of the electrical signal, and $I_{DC}$ represents a direct current component of the frequency spectrum of the electrical signal, and if L is greater than a preset fourth threshold, determining that the wavelength channel includes a real service signal.

Optionally, the processor 602 is further configured to:

if M is less than a preset second threshold, determine that the wavelength channel includes a real service signal, where the second threshold is less than the first threshold; or if L is less than a preset fifth threshold, determine that the wavelength channel includes a real service signal, where the fifth threshold is less than the fourth threshold.

Optionally, the processor 602 is further configured to:

if M is less than the first threshold and greater than the preset second threshold, determine that the wavelength channel does not include a real service signal, where the second threshold is less than the first threshold; or if L is less than the fourth threshold and greater than the preset fifth threshold, determine that the wavelength channel does not include a real service signal, where the fifth threshold is less than the fourth threshold.

Optionally, the processor 602 is further configured to:

if M is less than the first threshold or if L is less than the fourth threshold, determine a second parameter N according to an equation $N=(2N_{AC})/(-2(N_{AC}-I_{DC}^2)+\sqrt{4R^4(N_{AC}-I_{DC}^2)^2-4R^2N_{AC}(R^2N_{AC}-I_{DC}^2)})$, where R represents responsivity of a photodetector performing the optical-to-electrical detection; and if a real part of N is less than a preset third threshold, determine that the wavelength channel includes a real service signal; or if a real part of N is greater than the third threshold, determine that the wavelength channel does not include a real service signal.

Optionally, the first threshold is a value that is obtained in advance and that is between a minimum value of M of at least one real channel that includes an amplitude modulation service signal and a maximum value of M of at least one fake channel that does not include a real service signal, or the fourth threshold is a value that is obtained in advance and that is between a minimum value of L of at least one real channel that includes an amplitude modulation service signal and a maximum value of L of at least one fake channel that does not include a real service signal; and/or the second threshold is a value that is obtained in advance and that is between a minimum value of M of at least one fake channel that does not include a real service signal and a maximum value of M of at least one real channel that includes a phase modulation service signal, or the fifth threshold is a value that is obtained in advance and that is between a minimum value of L of at least one fake channel that does not include a real service signal and a maximum value of L of at least one real channel that includes a phase modulation service signal; and/or the third threshold is a value that is obtained in advance and that is between a minimum value of a real part of N of at least one fake channel that does not include a real service signal and a maximum value of a real part of N of at least one real channel that includes a phase modulation service signal.

Optionally, the processor 602 is further configured to:

if it is determined that the wavelength channel includes a real service signal, obtain an optical power of the wavelength channel; and if it is determined that the wavelength channel does not include a real service signal, report, by using the network interface 605, that the wavelength channel does not include a real service signal.

It can be seen from the foregoing technical solutions provided in the embodiments of the present invention that in the embodiments of the present invention, it is determined according to a relationship between an alternating current component of a frequency spectrum of an electrical signal and a preset threshold or according to a relationship between an alternating current component and a direct current component that are of a frequency spectrum of an electrical signal and preset thresholds whether a wavelength channel includes a real service signal, so that an erroneous configuration or operation of a network management system can be avoided.

It should be understood that the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for monitoring a wavelength channel, comprising:
   performing optical-to-electrical detection on an optical signal on the wavelength channel, to obtain an electrical signal;
   obtaining a frequency spectrum of the electrical signal;
   determining a first parameter M according to an equation $M=N_{AC}$, wherein $N_{AC}$ represents an alternating current component of the frequency spectrum of the electrical signal;
   if M is greater than a preset first threshold, determining that the wavelength channel comprises a first real service signal; and
   if M is less than the first threshold and greater than a preset second threshold, determining that the wavelength channel does not comprise any real service signal, wherein the second threshold is less than the first threshold.

2. The method according to claim 1, wherein the method further comprises: if M is less than a preset second threshold, determining that the wavelength channel comprises a second real service signal, wherein the second threshold is less than the first threshold.

3. The method according to claim 2, wherein the method further comprises:
   if M is less than the first threshold, determining a second parameter N according to an equation $N=(2N_{AC})/(-2(N_{AC}-I_{DC}^2)+\sqrt{4R^4(N_{AC}-I_{DC}^2)^2-4R^2N_{AC}(R^2N_{AC}-I_{DC}^2)})$,
   wherein R represents responsivity of a photodetector performing the optical-to-electrical detection and $I_{DC}$ represents a direct current component of the frequency spectrum of the electrical signal; and
   if a real part of N is less than a preset third threshold, determining that the wavelength channel comprises a third real service signal; or if the real part of N is greater than the third threshold, determining that the wavelength channel does not comprise any real service signal.

4. The method according to claim 3, wherein
   the first threshold is obtained in advance and is between a first minimum value of M of at least one real channel that comprises an amplitude modulation service signal and a first maximum value of at least one noise signal relative to an expected noise signal; and/or
   the second threshold is obtained in advance and is between a minimum value of the at least one noise signal and a first maximum value of M of at least one real channel that comprises a first phase modulation service signal; and/or
   the third threshold is obtained in advance and is between the minimum value of the at least one noise signal and a second maximum value of the real part of N of at least one real channel that comprises a second phase modulation service signal.

5. The method according to claim 1, wherein the method further comprises:
   if it is determined that the wavelength channel comprises the first real service signal, obtaining an optical power of the wavelength channel; and
   if it is determined that the wavelength channel does not comprise any real service signal, reporting that the wavelength channel does not comprise any real service signal.

6. A method for monitoring a wavelength channel, comprising:
   performing optical-to-electrical detection on an optical signal on the wavelength channel, to obtain an electrical signal;
   obtaining a frequency spectrum of the electrical signal;

determining a first parameter L according to an equation $L=N_{AC}/I_{DC}^2$, wherein $N_{AC}$ represents an alternating current component of the frequency spectrum of the electrical signal, and $I_{DC}$ represents a direct current component of the frequency spectrum of the electrical signal; and if L is greater than a preset first threshold, determining that the wavelength channel comprises a first real service signal.

7. The method according to claim 6, wherein the method further comprises:

if L is less than a preset second threshold, determining that the wavelength channel comprises a second real service signal, wherein the second threshold is less than the first threshold.

8. The method according to claim 6, wherein the method further comprises:

if L is less than the first threshold and greater than a preset second threshold, determining that the wavelength channel does not comprise any real service signal, wherein the second threshold is less than the first threshold.

9. The method according to claim 8, wherein the method further comprises:

if L is less than the first threshold, determining a second parameter N according to an equation $N=(2N_{AC})/(-2(N_{AC}-I_{DC}^2)+\sqrt{4R^4(N_{AC}-I_{DC}^2)^2-4R^2N_{AC}(R^2N_{AC}-I_{DC}^2)})$, wherein R represents responsivity of a photodetector performing the optical-to-electrical detection; and if a real part of N is less than a preset third threshold, determining that the wavelength channel comprises a second real service signal; or if the real part of N is greater than the third threshold, determining that the wavelength channel does not comprise any real service signal.

10. The method according to claim 6, wherein the first threshold is obtained in advance and is between a first minimum value of L of at least one real channel that comprises an amplitude modulation service signal and a first maximum value of at least one noise signal relative to an expected noise signal; and/or the second threshold is obtained in advance and is between a minimum value of the at least one noise signal relative to the expected noise signal and a first maximum value of L of at least one real channel that comprises a first phase modulation service signal; and/or the third threshold is obtained in advance and is between the minimum value of the at least one noise signal and a second maximum value of the real part of N of at least one real channel that comprises a second phase modulation service signal.

11. The method according to claim 6, wherein the method further comprises:

if it is determined that the wavelength channel comprises the first real service signal, obtaining an optical power of the wavelength channel; and if it is determined that the wavelength channel does not comprise any real service signal, reporting that the wavelength channel does not comprise any real service signal.

12. An apparatus for monitoring a wavelength channel, comprising:

a photodetector, configured to perform optical-to-electrical detection on an optical signal on the wavelength channel, to obtain an electrical signal;

at least one processor configured to: obtain a frequency spectrum of the electrical signal; and determine a first parameter L according to an equation $L=N_{AC}/I_{DC}^2$, wherein $N_{AC}$ represents an alternating current component of the frequency spectrum of the electrical signal, and $I_{DC}$ represents a direct current component of the frequency spectrum of the electrical signal, and if L is greater than a preset first threshold, determine that the wavelength channel comprises a first real service signal.

13. The apparatus according to claim 12, wherein the at least one processor is further configured to:

determine a second parameter M according to an equation $M=N_{AC}$, wherein $N_{AC}$ represents an alternating current component of the frequency spectrum of the electrical signal, and if M is greater than a preset second threshold, determine that the wavelength channel comprises a second real service signal; and if M is less than a preset third threshold, determine that the wavelength channel comprises a third real service signal, wherein the third threshold is less than the second threshold; or if L is less than a preset fourth threshold, determine that the wavelength channel comprises a fourth real service signal, wherein the fourth threshold is less than the first threshold.

14. The apparatus according to claim 12, wherein the at least one processor is further configured to:

determine a second parameter M according to an equation $M=N_{AC}$, wherein $N_{AC}$ represents an alternating current component of the frequency spectrum of the electrical signal, and if M is greater than a preset second threshold, determine that the wavelength channel comprises a second real service signal; and if M is less than the second threshold and greater than a preset third threshold, determine that the wavelength channel does not comprise any real service signal, wherein the third threshold is less than the second threshold; or if L is less than the first threshold and greater than a preset fourth threshold, determine that the wavelength channel does not comprise any real service signal, wherein the fourth threshold is less than the first threshold.

15. The apparatus according to claim 14, wherein the at least one processor is further configured to:

if M is less than the second threshold or if L is less than the first threshold, determine a third parameter N according to an equation $N=(2N_{AC})/(-2(N_{AC}-I^2_{DC})+\sqrt{4R^4(N_{AC}-I^2_{DC})^2-4R^2N_{AC}(R^2N_{AC}-I^2_{DC})})$, wherein R represents responsivity of the photodetector performing the optical-to-electrical detection; and if a real part of N is less than a preset fifth threshold, determine that the wavelength channel comprises a third real service signal; or if the real part of N is greater than the fifth threshold, determine that the wavelength channel does not comprise any real service signal.

16. The apparatus according to claim 15, wherein the second threshold is obtained in advance and is between a first minimum value of M of at least one real channel that comprises an amplitude modulation service signal and a first maximum value of at least one noise signal relative to an expected noise signal, or the first threshold is obtained in advance and is between a second minimum value of L of at least one real channel that comprises an amplitude modulation service signal and a second maximum value of the at least one noise signal relative to the expected noise signal; and/or the third threshold is obtained in advance and is between a third minimum value of the at least one noise signal and a third maximum value of M of at least one real channel that comprises a first phase modulation service signal, or the fourth threshold is obtained in advance and is between the third minimum value of the at least one noise signal relative to the expected noise signal and a fourth maximum value of L of at least one real channel that comprises a second phase modulation service signal; and/or the fifth threshold is obtained in advance and is between the third minimum value of the at least one noise signal and a fifth maximum value of the real part of N of at least one real channel that comprises a third phase modulation service signal.

17. The apparatus according to claim 12, wherein the at least one processor is further configured to:

when the determining module determines that the wavelength channel comprises the any of the first through fourth real service signals, obtain an optical power of the wavelength channel; and when the determining module determines that the wavelength channel does not comprise any real service signal, report that the wavelength channel does not comprise any real service signal.

* * * * *